(No Model.) 3 Sheets—Sheet 2.

G. W. LEWIS.
VEHICLE MOTOR.

No. 604,332. Patented May 17, 1898.

Witnesses
Wm. M. Rhea
John W. Adams

Inventor
George W. Lewis
by Dayton, Poole & Brown
his Attys (No Model.)

G. W. LEWIS.
VEHICLE MOTOR.

No. 604,332.

3 Sheets—Sheet 3.

Patented May 17, 1898.

Witnesses,
Wm. N. Rheem.
John W. Adams.

Inventor:—
George W. Lewis
by Dayton, Poole & Brown
his Att'ys

UNITED STATES PATENT OFFICE.

GEORGE W. LEWIS, OF CHICAGO, ILLINOIS.

VEHICLE-MOTOR.

SPECIFICATION forming part of Letters Patent No. 604,332, dated May 17, 1898.

Application filed January 31, 1895. Renewed October 25, 1897. Serial No. 656,319. (No model.)

*To all whom it may concern:*

Be it known that I, GEORGE W. LEWIS, of Chicago, in the county of Cook and State of Illinois, have invented certain new and useful Improvements in Vehicle-Motors; and I do hereby declare that the following is a full, clear, and exact description thereof, reference being had to the accompanying drawings, and to the letters of reference marked thereon, which form a part of this specification.

This invention relates to power-driven vehicles of that class which are actuated by gas-engines, steam-engines, or other similar motors, and more especially to the driving or actuating connections of such vehicles by which power is transmitted from the reciprocating pistons of the prime mover to the driving-wheels.

The invention consists in the matters hereinafter described, and pointed out in the appended claims.

Figure 1:
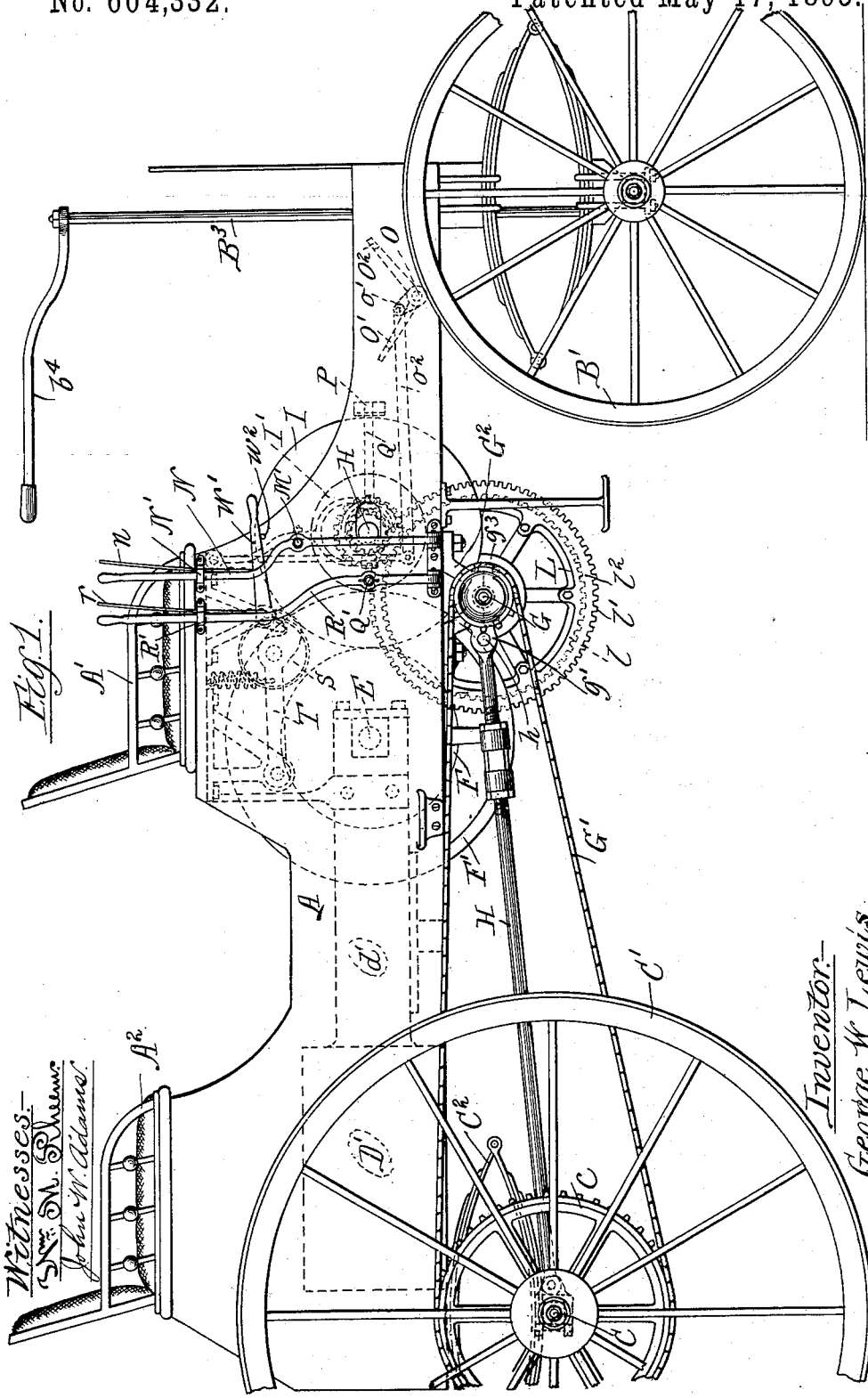
Figure 2:
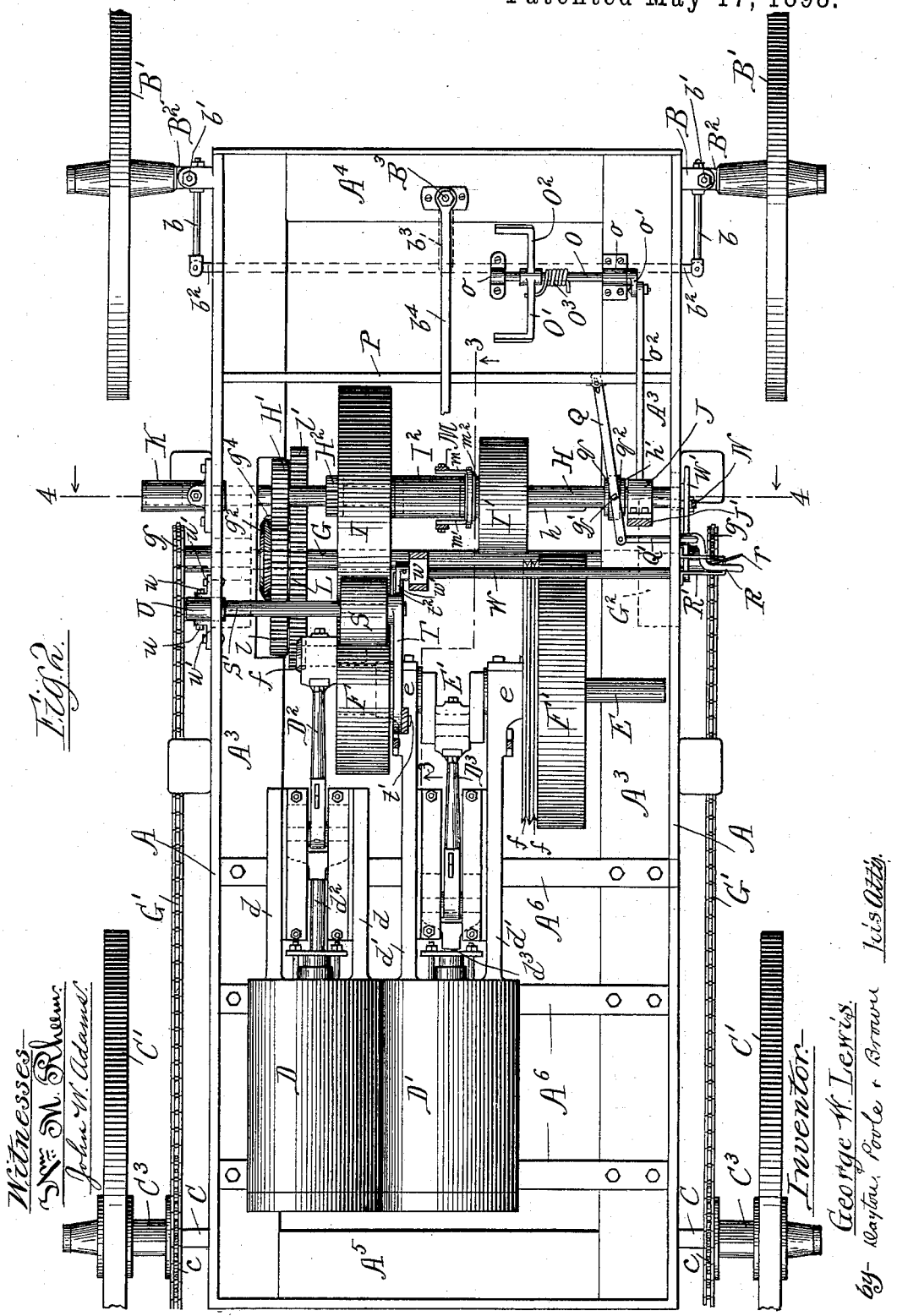
Figure 3:
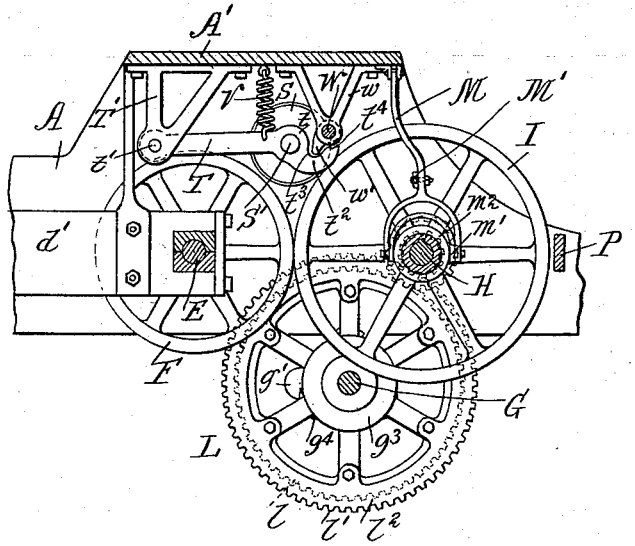
Figure 4:
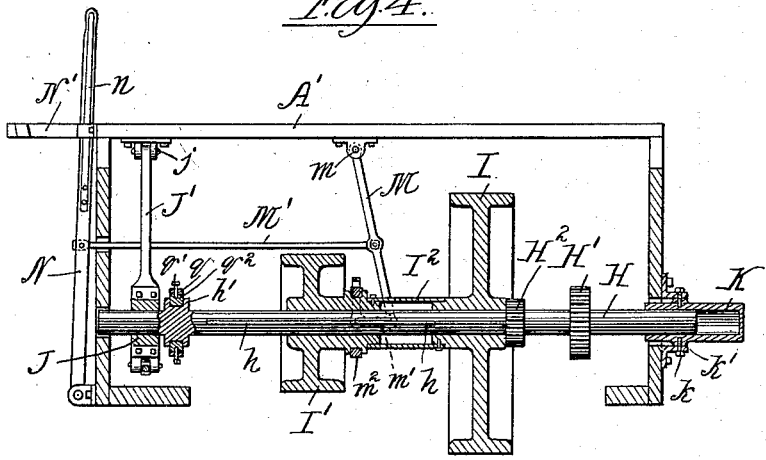

In the accompanying drawings, illustrating my invention, Figure 1 is a view in side elevation of a vehicle embodying the same. Fig. 2 is a plan view thereof. Fig. 3 is a detail sectional elevation taken on line 3 3 of Fig. 2. Fig. 4 is a detail cross-section taken on line 4 4 of Fig. 2.

As shown in said drawings, A indicates the body of the vehicle, in this instance having the form of a light road-wagon, having front and rear transverse seats $A'$ $A^2$. Said body A is conveniently provided with a rectangular frame of approximately the same length and width as the body and on which the several operative parts of the motor are mounted, the frame in the instance illustrated consisting of longitudinal side frame-pieces $A^3$ $A^3$ and cross-pieces $A^4$ $A^5$ at the front and rear of the body. Three parallel cross-girths $A^6$ $A^6$ extend between the longitudinal frame-pieces at the rear part of the body to support the motor proper or prime mover.

B indicates the front axle of the vehicle, and $B'$ $B'$ the front wheels, which latter are mounted on short or stub axle-arms $B^2$ $B^2$, pivotally connected with the main part of the front axle.

C indicates the rear axle, and $C'$ $C'$ the rear wheels, which latter form the driving-wheels of the vehicle to which power is applied.

D D' indicate the cylinders of a two-cylinder gas or vapor engine or other prime mover having reciprocating pistons. Said cylinders are arranged horizontally and longitudinally of the vehicle-body, being supported by attachment to the cross-girths $A^6$ $A^6$, on which they rest. Attached to the cylinders are cross-head guides $d$ $d$ $d'$ $d'$, which are also supported by one of the cross-girths $A^6$. $d^2 d^3$ indicate the piston-rods, and $D^2 D^3$ connecting-rods by which motion is transmitted from the pistons to a main crank-shaft E. Said crank-shaft is mounted in bearings $e e$, formed in the instance shown by the end portions of the piston-rod guides $d'$ $d'$ of the cylinder D', which cylinder is located near the middle longitudinal line of the vehicle. The crank-shaft is provided between the bearings $e$ $e$ with a crank $E'$, formed by means of two crank-arms and a crank-pin connecting the same in the usual manner. Said crank is engaged by the pitman $D^3$ of the cylinder D'. Mounted on the crank-shaft, outside of the bearings $e e$, are two driving-pulleys F F', both of which are rigidly secured to the shaft and one of which, F, is provided on its outer face with a crank-pin $f$, which is engaged with and acted on by the pitman $D^2$, belonging to the cylinder D. The pulley F' is considerably larger in diameter than the pulley F, and both of said pulleys are provided with smooth cylindric peripheral bearing-surfaces of considerable width, said pulleys forming parts of a friction-gear by which motion is transmitted from the prime mover to the driving-wheels of the vehicle.

To next refer to the features of construction illustrated in the rear axle and driving-wheels of the vehicle: The said rear axle C is located below the rear part of the vehicle-body, and between the body and the axle are located supporting-springs $C^2$, herein shown as made of ordinary elliptic form. The rear driving-wheels are adapted to turn on the rear axle and are provided with central elongated sleeves or hubs $C^3$, to the inner ends of which are secured or attached sprocket-wheels $c$ $c$. A driving-shaft G is mounted transversely on the vehicle-frame at a point near the crank-shaft E, said driving-shaft being provided at its ends with sprocket-wheels $g$ $g$, arranged in the same vertical plane with the sprocket-wheels $c$ $c$. Chain belts G' G' are trained over the two pairs of sprocket-wheels c and g to transmit rotary motion from the driving-shaft to the wheels. Said driving-shaft G is mounted in bearings $G^2 G^2$, attached to the under surfaces of the frame-pieces $A^3$, and in the instance shown having the form of brackets depending from said frame-pieces.

H H are rigid connecting-rods or distance-pieces which are located at opposite sides of the vehicle-body and are pivotally connected at their rear ends with the rear axle and at their front ends with the vehicle-body at points adjacent to the driving-shaft G. These distance-pieces are for the purpose of maintaining the rear axle at a constant distance from the driving-shaft, notwithstanding vertical movement of the rear part of the body relatively to the rear axle, so as to maintain the driving connection between the parts in proper operative positions. As herein shown, the coupling-rods are connected with the bearings H by means of pivot-pins $h$, inserted through the ends of the connecting-rod and through rearwardly-projecting lugs $g'$ $g'$ on the bearings $G^2 G^2$. At their rear ends the distance-rods are connected with shackles on the rear axle by means of pivotal joints, as clearly shown in dotted lines, Fig. 1. Turnbuckles in the distance-pieces enable the length of the same to be changed or adjusted as desired or as may be found necessary.

The driving connections by which motion is transmitted from the prime mover to the shaft G embrace a friction speed-changing device, of which the pulleys F F' form parts, and also a spur-gear speed-changing device, together with an equalizing mechanism for equalizing the power transmitted to the two driving-wheels.

To first refer to the friction speed-changing device, the same is made as follows: A shaft H extends across the vehicle-frame in front of the crank-shaft E and parallel with the latter. On said shaft are mounted two friction-pulleys I I', of which the pulley I is larger in diameter than the pulley I'. The pulley I' is adapted for frictional engagement with the pulley F' and the pulley I with the pulley F; but the pulleys I and I' are placed closer together than the pulleys F and F', so that one pair only of said pulleys can be engaged with each other at once, the said pulleys on the shaft H being movable endwise thereon and rigidly connected with each other, so that either of the pulleys may be brought into engagement with one of the pulleys F and F' by an endwise movement of both pulleys on the shaft. The said pulleys I and I' are rigidly connected with each other by a sleeve $I^2$, Fig. 4, and are held from turning on the shaft H by a spline $h$ thereon. The shaft H is made laterally movable in a horizontal plane in order to enable the pulleys thereon to be brought into contact with or released from the pulleys F F' in stopping or starting the vehicle. To afford such lateral movement in the said shaft, one end of the same is mounted in a laterally-movable bearing J, which is attached to a vertical supporting-arm J' and is given motion and held in position by a suitable hand actuating device under the control of the operator, as will be hereinafter more fully described. The supporting-arm J depends from a suitable support, in the instance shown formed by the seat A', to the under surface of which the arm is pivotally connected by a hinged joint $j$. At its opposite end the shaft H is mounted in a bearing K, which is movably connected with the vehicle-frame, so as to move with the shaft when the bearing J is moved or oscillated. The bearing K in the drawing 5 consists of a tube the upper and lower sides of which are engaged by pivot-pins $k$ $k$, inserted through brackets $k'$ $k'$ on the side wall of the vehicle-body. The sleeve K is shown as closed at its outer end, but as made of considerable length, so as to allow the shaft H to slide endwise thereon, the shaft being adapted to slide endwise in both of said bearings J and K, for a purpose hereinafter pointed out. The pulleys I and I' are held in place on the shaft and shifted endwise thereon by an actuating device under the control of the operator, as will hereinafter appear.

The spur-gear speed-changing device affords direct driving connection between the shafts G and H and is constructed as follows: L is a double gear-wheel mounted on the shaft G and connected with the same through the medium of the equalizing device hereinbefore mentioned. Said gear-wheel is provided with two sets of gear-teeth $l$ $l'$, the larger, $l'$, of which is shown as formed on a separate ring $l^2$, attached to the body of the gear-wheel. The shaft H is provided with two pinions H' $H^2$, which are rigidly attached to the shaft at some distance from each other and either of which may be brought into mesh with the gear-wheel L by an endwise movement of the shaft. The pinion H' is larger than the pinion $H^2$ and is adapted for engagement with the gear-teeth $l$, while the smaller pinion $H^2$ is adapted to intermesh with the gear-teeth $l'$ on the larger part of the gear-wheel. Devices for moving endwise the shaft H for bringing one or the other of the said pinions into mesh with the gear-wheel will be hereinafter described.

The equalizing device referred to is constructed in the same manner as other similar devices, is not shown in detail, and need not be herein fully described. Generally it is like that set forth in my prior application for patent, Serial No. 522,880, filed September 13, 1894, and embraces two miter-gears secured to separated parts of the shaft G and miter-pinions carried by the wheel L and intermeshing with both of said miter-gears. One of said miter-gears is indicated by $g^2$ in Fig. 2 and the other by $g^3$ in Figs. 1 and 3, while the pinions are indicated by $g^4$ in Figs. 2 and 3.

As will be understood from the above description of the friction change-speed and stopping and starting devices, either pair of pulleys I F or I' F' may be brought opposite each other for changing the speed of the shaft H by the act of moving the said pulleys I I' endwise on said shaft, while the pulleys which may at any time be opposite each other may be brought together or separated by shifting laterally said shaft H.

Devices for giving endwise movement to the pulleys I I' on the shaft H are herein provided as follows: M is a swinging arm pivoted at its upper end by a hinged joint $m$ to a suitable support, in this instance the seat A', and having a forked lower end, Figs. 3 and 4, which extends at either side of the shaft H between the pulleys I and I'. The prongs of the said arm are connected by links $m'$ with a collar $m^2$, which fits within a groove in the hub of the wheel I' in a familiar manner. Attached to the arm M is a horizontally-arranged actuating-rod M', which extends to the side of the vehicle-frame and is there attached to an upright hand-lever N, in this instance located outside of the vehicle-body at one end of the seat A'. At its upper end the said lever is provided with a spring locking-detent $n$, adapted for engagement with a notched arm N' on the vehicle-frame for holding the lever at either limit of its movement.

For moving the bearing J to stop and start the vehicle devices are provided as follows: O, Figs. 1 and 2, is a rock-shaft arranged transversely at the bottom of the body and mounted in bearings $o$ $o$ there located. The shaft O is provided with two rigid actuating-levers O' O², extending therefrom at different angles and having laterally-bent ends adapted for convenient application of the foot of the operator thereto, two levers being used in order that the rock-shaft may be turned in either direction by the use of the foot. Said rock-shaft is also provided with a rigid crank-arm, which extends upwardly therefrom and is connected by means of a rod $o^2$ with the bearing J. A spring O³ is applied to throw the bearing J away from the crank-shaft E, said spring being herein shown as having the form of a coiled-wire spring surrounding the rock-shaft O and having an outwardly-extending arm which acts on the lever O' to turn the rock-shaft. The said spring tends to keep the friction-pulleys free from contact with each other; but by pressing downwardly on the lever M' the pulleys will be pressed together with required force.

At the side of the shaft H opposite the crank-shaft E and parallel with said shaft is located a friction bar or strip P, placed at such distance from the shaft that the pulley I may be brought into contact with said strip by a movement of the shaft H only slightly greater than that required for separating the friction-pulleys from each other. Said strip P conveniently consists of a board or plate extending the full width of the vehicle-body and attached to the bottom and sides of the same. Such friction-strip, in connection with the actuating devices for the shaft H, by which the pulley I' may be pressed or held forcibly against the strip, constitutes a frictional retarding or brake device by which the motion of the vehicle may be easily and completely controlled. As far as its general construction is concerned, however, this brake device is like that shown in my prior application hereinbefore referred to.

To now refer to the devices illustrated for moving endwise the shaft H for the purpose of bringing either the gear-pinion H' or H² into engagement with the gear I of the spur-gear speed-changing device, these parts are made as follows: Q, Fig. 2, is a horizontal lever pivoted at its front end to the machine-frame, conveniently by attachment to the friction-strip P, and connected at its rear end with an actuating-rod Q', which extends outwardly past the side of the vehicle-body and is attached to a hand-lever R. Between its ends the lever Q is provided with an integral ring $q$, which surrounds the shaft H and is connected by pivots $q'$ $q'$ with a ring $q^2$, which is engaged with a grooved collar $h'$ on said shaft. The hand-lever R is provided at its upper end with a spring-detent $r$, adapted to engage the notches of a notched bar R', attached to the end of the seat A'.

In the use of the vehicle having both spur-gear and friction speed-changing devices thus constructed the pinion H' will commonly remain in engagement with the gear-wheel L and the necessary variations of speed in running will be afforded by means of the two pairs of friction-pulleys and by manipulation of the contact or pressure lever O', so as to allow a greater or less extent of slipping or lost motion between the friction-pulleys. In case, however, it is desired that the vehicle should be propelled very slowly, but with much power, as in climbing hills, then the shaft H is shifted by the use of the lever R, so as to bring the smaller pinion H² into mesh with the gear-wheel L, thereby giving slower motion to the driving-wheels with increased power.

In order to provide for reversing the direction of motion of the driving-wheels, so as to run the vehicle backward when desired, devices are provided as follows:

S indicates a friction reversing-pulley located over the pulleys F and I in position for contact with both of said last-named pulleys. Said pulley S is supported in such manner that it may be moved laterally into and out of contact with said pulleys, the term "laterally" being used in the sense of movement in a plane perpendicular to the axis of the shaft on which the pulley is mounted and is intended for engagement with the same only when they are separated or free from contact with each other, the pulley S in such case affording the sole driving connection between them and constituting a reversing device by which the pulley I and shaft H, on which it is mounted, may be turned or driven in a direction opposite to that in which it is rotated by the direct action of the pulley F on the pulley I. Said pulley S is mounted on a transverse shaft S', which in the instance illustrated extends only part way across the machine-frame and is mounted on suitable bearings which engage the end of the shaft and which are capable of movement in such manner as to permit the said pulley to be thrown in contact with or released from the pulleys F and I. At its end nearest the pulleys F and I the shaft S' is mounted in the free end of a horizontal arm T, which arm is provided with a bearing $t$ for the shaft at its free end, and at its opposite end is pivoted by means of a pivot-pin $t'$ to a bracket or hanger T', attached to the under surface of the seat A'.

At its opposite or outer end the shaft S' is mounted in a bearing U, having the form of a tube and which is supported upon the vehicle-frame in such manner as to enable it to swing on a vertical plane, thus giving freedom of movement to the opposite or inner end of the shaft. In the particular construction illustrated the bearing U is pivotally connected with the side wall of the vehicle-body by means of pivot-pins $u$ $u$, which are inserted through outwardly-extending brackets $u'$, attached to the outer surface of the vehicle side wall.

For throwing the pulley S downward or into contact with the pulleys F and I and for releasing it from the same when desired actuating means are applied to the supporting-arm T, the same being constructed as follows: Said supporting-arm is maintained normally in an elevated position, or in such position as to sustain the pulley S a short distance from the pulleys F and I, by means of a spring V, the same being herein shown as having the form of a contractile coiled spring secured at its lower end to the arm T and at its upper end to the lower surface of the seat A', Fig. 3. For forcing downwardly the arm T to bring the pulley S into contact with the said pulleys F and I devices are provided as follows: Extending downwardly from the free end of said arm T is a lug $t^2$ of curved form having a central depression $t^3$ and at its extremity an upwardly-facing notch $t^4$. W indicates a rock-shaft which extends across the machine-frame, with its inner end adjacent to and over the lug $t^2$, above mentioned, and which reaches to the opposite side of the vehicle-body and terminates outside of the same. Said rock-shaft is shown as mounted at its inner end on a hanger or bracket $w$, secured to the bottom of seat A', and as mounted at its outer end on that part of the side wall of the body which rises to support the seat A'. At its inner end the rock-shaft W is provided with a cam-arm or radical projection $w'$, the same being rigidly attached to the shaft. Said cam-arm rests normally in the recess $t^3$ of the lug $t^2$; but when the rock-shaft is turned in a direction to carry it outwardly along the lug it acts on the inclined surface of the recess in such manner as to force the arm $t$ downwardly, bringing the pulley S into position for engagement with the pulleys F and I. Said cam-arm $w'$ reaches a position for engagement with the notch $t^4$ at the outer end of the lug at the time when the arm $t$ is depressed sufficiently to bring the pulley S properly into contact with the pulleys beneath it. Said notch thus constitutes a locking device, by which release of the reversing-pulley will be prevented unless the rock-shaft be turned backwardly with force sufficient to carry the cam-arm out of the notch. For actuating the rock-shaft W a hand-lever W' is attached to its outer end, the same being conveniently extended horizontally forward from the rock-shaft, so that its front end projects beyond the seat, thereby bringing it into position to be grasped by the hand of the operator while sitting at the adjacent end of the seat. A stop $w^2$ limits the downward movement of the said hand-lever, its upward movement being limited by the entrance of the cam-arm $w'$ into the notch $t^4$.

Inasmuch as the reversing-pulley S acts on the driving-pulleys F and I it will be seen that the vehicle can only be reversed or driven backward when driven at a relatively slow speed, it being obviously unnecessary that the reversing device should be brought into use when the vehicle is being operated at its highest speed afforded by the action of the friction-pulleys F' and I'.

Means are provided for steering the vehicle like that illustrated in said prior application hereinbefore referred to. This device consists of rearwardly-extending arms $b$ $b$, attached to the stub-axles $B^2$, which latter are connected with the main part B of the front axle by vertical pivots $b'$ $b'$. The arms $b$ are connected to each other by a transverse rod $b^2$, attached at its middle to an arm $b^3$ on a vertical rock-shaft $B^3$, which rises through the frame of the vehicle, at the front end of the same. Said rock-shaft is provided with a rearwardly-extending actuating arm or tiller, which is grasped by the hand of the operator for steering the vehicle.

As hereinbefore stated, the frictional speed-changing device is adapted for giving such changes of speed as are required in the ordinary operation of the vehicle, while the positively-acting or spur-gear speed-changing device is used only when it is desired to give slow speed with great power, as in ascending hills or under like circumstances. The shifting of the spur-gears of the last-named speed-changing device can of course only be accomplished when the friction driving-pulleys are separated and the motor is transmitting no power to the driving-wheels. It is, however, practicable to shift the said gears without stopping the vehicle, because when the friction-pulleys are disconnected the shaft H will be turned only by the motion given it from the driving-wheels by reason of the inertia of the vehicle and there will be no strain on the spur-gearing sufficient to prevent its being easily changed or shifted. The said spur-gearing may therefore be easily and quickly changed in practice by first actuating the foot-lever O' to disconnect the friction-pulleys, then throwing the hand-lever R to shift the shaft H endwise, and thereafter applying pressure to the foot-lever O' to again bring the friction-pulleys into contact and restore connection with the motor.

The reversing-gear may be thrown into and out of operation with equal ease and convenience. If it be desired to back the vehicle, it is only necessary to release pressure on the foot-lever O', so as to allow the friction-pulleys to separate, and to then draw upwardly upon the hand-lever W' until the cam-arm $w'$ enters the notch $t^4$. Backward motion of the vehicle will then continue as long as the parts are maintained in this position. It will of course be understood that the friction-pulley I may be released from contact with the reversing-pulley S to stop the vehicle when running backward by suitable manipulation of the foot-lever O' in the same manner as when the said pulley I is running in contact with the driving-pulley F.

One of the pulleys F' in the crank-shaft E is shown as provided with two grooves $f f$, intended to receive driving-belts, such as may be employed to drive a small electric generator for producing light or other auxiliary mechanism on the vehicle.

I claim as my invention—

1. The combination with vehicle driving-wheels and a prime mover, of a friction driving-gear comprising a shaft which is actuated by the prime mover, two friction-pulleys of different sizes on said shaft, a second shaft arranged parallel with the first shaft and movable laterally toward and from the same, two friction-pulleys on the second shaft which are movable in a direction endwise of the shafts relatively to the pulleys on the first shaft, the pulleys on the two shafts being located at different distances apart and means applied to the second shaft for giving lateral movement to the same, substantially as described.

2. The combination with vehicle driving-wheels and a prime mover of a friction driving-gear, comprising a shaft which is actuated by the prime mover, two friction-pulleys of different sizes on said shaft, a second shaft arranged parallel with the first shaft and movable laterally toward and from the same, two friction-pulleys mounted to slide endwise on the second shaft and rigidly connected with each other and means applied to move laterally the second shaft, substantially as described.

3. The combination with vehicle driving-wheels and a prime mover of a friction driving-gear, comprising a shaft which is actuated by the prime mover, two friction-pulleys of different sizes mounted on said shaft, a second shaft arranged parallel with the first shaft and movable laterally toward and from the same, two friction-pulleys mounted to slide endwise on said second shaft actuating means connected with said pulleys for moving them endwise on the shaft and means applied to the second shaft for giving lateral movement to the same, substantially as described.

4. The combination with vehicle driving-wheels and a prime mover of a friction driving-gear, comprising a shaft which is actuated by the prime mover, two friction-pulleys of different sizes mounted on the said shaft, a second shaft arranged parallel with the first shaft and movable laterally toward and from same, two friction-pulleys arranged to slide endwise on said second shaft and rigidly connected with each other, and means for moving said pulleys on the shaft, comprising an oscillating arm connected with a ring which engages a groove in the hub of one of the pulleys, a hand-lever and a connecting-bar uniting the hand-lever with said oscillating arm, substantially as described.

5. The combination with vehicle driving-wheels and a prime mover, of a friction driving-gear, comprising a shaft which is actuated by the prime mover, two friction-pulleys of different sizes mounted on said shaft, a second shaft arranged parallel with the first shaft and movable laterally toward and from same, two friction-pulleys on said second shaft which are movable relatively to the pulleys on the first shaft, a laterally-movable bearing for one end of said second shaft, an upright arm at the free end of which said bearing is attached, and an actuating device connected with said bearing for giving lateral movement with the said second shaft, substantially as described.

6. The combination with vehicle driving-wheels and a prime mover of a friction driving-gear, comprising a shaft which is actuated by a prime mover, two friction-pulleys of different sizes mounted thereon, a second shaft arranged parallel with the first shaft and movable laterally toward and from the same, two friction-pulleys on said second shaft which are movable relatively to the pulleys on the first shaft a movable bearing for one end of the said second shaft and means connected with said movable bearing for shifting said shaft laterally, consisting of a rock-shaft provided with a crank-arm which is connected with said bearing and with an actuating-lever and a spring applied to one of said bars to throw the second shaft away from the first shaft, substantially as described.

7. The combination with vehicle driving-wheels and a prime mover of a friction driving and brake gear, comprising a shaft which is actuated by a prime mover, two friction-pulleys of different sizes on said shaft, a second shaft arranged parallel with the first shaft and movable laterally toward and from the same, two friction-pulleys of different sizes mounted on the second shaft and movable relatively to the pulleys on the first shaft, a friction-strip arranged parallel with the said shafts in position for contact therewith of the larger of the pulleys on the second shaft and means for giving lateral movement to said second shaft, substantially as described.

8. The combination with vehicle driving-wheels and a prime mover, of a friction driving and brake gear, comprising a shaft which is actuated by a prime mover, two friction-pulleys of different sizes on said shaft, a second shaft arranged parallel with the first shaft and movable laterally toward and from the same, two friction-pulleys of different sizes mounted on the second shaft and movable relatively to the pulleys on the first shaft, a friction-strip arranged parallel with the said shafts in position for contact therewith of the larger of the pulleys on the second shaft, a laterally-movable bearing for one end of said second shaft and means for moving laterally the second shaft, comprising a rock-shaft provided with a crank-arm which is connected with the bearing and provided also with two foot-levers, one for throwing the friction-pulleys into engagement with each other the other for throwing the larger friction-pulley into contact with the said friction-strip, substantially as described.

9. The combination with vehicle driving-wheels and a prime mover, of a combined friction and spur gear driving device, comprising a shaft which is actuated by the prime mover, two friction-pulleys of different sizes on said shaft, a second shaft arranged parallel with the first shaft and movable laterally toward and from the first shaft, two friction-pulleys on the said second shaft which are movable relatively to the pulleys on the first shaft, a third shaft having operative connection with the driving-wheels, two spur-gears of different sizes on said third shaft, two spur-gears of different sizes mounted on said second shaft and movable relatively to those on the third shaft and means for giving lateral movement to said spur-gears on the second shaft, substantially as described.

10. The combination of vehicle driving-wheels and a prime mover of a combined friction and spur gear driving device, comprising a shaft which is driven by the prime mover, two friction-pulleys of different sizes on said shaft, a second shaft arranged parallel with the first shaft and movable both laterally and endwise, two friction-pulleys of different sizes mounted to move endwise on the second shaft, a third shaft having operative connection with the driving-wheels, two spur-gears of different sizes on said third shaft two spur-gears of different sizes secured to the second shaft and adapted for engagement with the spur-gears on the third shaft by endwise movement of said second shaft and means for giving endwise movement to said second shaft, substantially as described.

11. The combination with vehicle driving-wheels and a prime mover, of a combined friction and spur gear driving device, comprising a shaft which is driven by the prime mover, two friction-pulleys of different sizes on said shaft, a second shaft arranged parallel with the first shaft and movable both endwise and laterally, two friction-pulleys mounted to slide endwise on said second shaft, said pulleys being rigidly connected with each other, a third shaft having operative connection with the driving-wheels, two spur-gears of different sizes on said third shaft, two spur-gears of different sizes rigidly attached to said second shaft, a laterally-movable bearing for one end of said second shaft, an actuating-lever connected with said movable bearing for giving lateral movement to the said second shaft, an actuating-lever connected with said pulleys on the second shaft for moving them endwise on said shaft and an actuating-lever connected with said second shaft for giving endwise movement to the latter, substantially as described.

12. The combination of vehicle driving-wheels and a prime mover, of friction driving and reversing gear, comprising a shaft which is actuated by the prime mover, a second shaft arranged parallel with the first shaft and movable toward and from the same, two friction-pulleys of unequal sizes on the first shaft, two friction-pulleys of different sizes mounted on the second shaft and movable thereon relatively to the pulleys on the first shaft, gearing connecting said second shaft with the driving-wheel, means applied to the said second shaft for moving it toward and from the first shaft and a laterally-movable reversing-pulley adapted for contact with said friction-pulleys for reversing the direction of rotation of the second shaft, substantially as described.

13. The combination with vehicle driving-wheels and a prime mover, of a friction driving and reversing gear, comprising a shaft which is actuated by the prime mover, a second shaft arranged parallel with the first shaft and movable toward and from the same, friction-pulleys on said shafts, a laterally-movable reversing-pulley, a shaft on which said reversing-pulley is mounted, a pivotal arm affording a bearing for one end of said reversing-pulley shaft and means for giving lateral movement to the reversing-pulley, comprising a lug or projection on said pivoted arm provided with a holding-notch and a rock-shaft provided with a cam-arm adapted for engagement with said lug or projection, substantially as described.

In testimony that I claim the foregoing as my invention I affix my signature in presence of two witnesses.

GEORGE W. LEWIS.

Witnesses:
C. CLARENCE POOLE,
WILLIAM L. HALL.